United States Patent
Codd et al.

(10) Patent No.: US 9,399,700 B2
(45) Date of Patent: Jul. 26, 2016

(54) ULTRA-HIGH IV POLYESTER FOR EXTRUSION BLOW MOLDING AND METHOD FOR ITS PRODUCTION

(71) Applicant: DAK AMERICAS LLC., Charlotte, NC (US)

(72) Inventors: Helen J. Codd, Wilmington, NC (US); George F. Rollend, Amherst, NH (US); Norman W. Lisson, Mount Pleasant, SC (US)

(73) Assignee: DAK AMERICAS LLC., Charlotte, NC (US)

( * ) Notice: Subject to any disclaimer, the term of this patent is extended or adjusted under 35 U.S.C. 154(b) by 0 days.

(21) Appl. No.: 13/760,784

(22) Filed: Feb. 6, 2013

(65) Prior Publication Data

US 2013/0183470 A1 Jul. 18, 2013

Related U.S. Application Data

(62) Division of application No. 12/760,030, filed on Apr. 14, 2010.

(51) Int. Cl.
*C08G 63/80* (2006.01)

(52) U.S. Cl.
CPC ........... *C08G 63/80* (2013.01); *Y10T 428/1352* (2015.01); *Y10T 428/1397* (2015.01)

(58) Field of Classification Search
CPC ............. C08G 63/80; Y10T 428/1352; Y10T 428/1397

USPC ............. 528/272, 308.1, 208.2, 308.3, 308.6, 528/308.8; 428/34.1, 35.7, 36.92; 264/239, 264/319, 500, 540; 525/437, 448
See application file for complete search history.

(56) References Cited

U.S. PATENT DOCUMENTS

| | | | |
|---|---|---|---|
| 4,011,188 A | 3/1977 | Ruter et al. | |
| 4,080,317 A * | 3/1978 | Morawetz et al. | 525/437 |
| 4,330,661 A | 5/1982 | Go | |
| 6,559,271 B2 | 5/2003 | Schaaf et al. | |
| 2005/0215753 A1 | 9/2005 | Otto et al. | |
| 2007/0128389 A1 | 6/2007 | Kezios et al. | |
| 2007/0219341 A1 | 9/2007 | Hally et al. | |
| 2008/0090975 A1 | 4/2008 | Yokoyama et al. | |

FOREIGN PATENT DOCUMENTS

| | | |
|---|---|---|
| CN | 101068848 A | 11/2007 |
| CN | 101184593 A | 5/2008 |
| EP | 2 033 753 A2 | 3/2009 |
| JP | 2008-542062 A | 11/2008 |

(Continued)

OTHER PUBLICATIONS

Office Action issued Dec. 10, 2013 in Chinese Application No. 201180029506.X (With English Translation).

(Continued)

*Primary Examiner* — Frances Tischler

(74) *Attorney, Agent, or Firm* — Oblon, McClelland, Maier & Neustadt, L.L.P.

(57) ABSTRACT

An ultra-high IV polyester suitable for high melt strength end-uses, such as injection blow molding, pipe extrusion, profile extrusion, and extrusion blow molding, is provided, having IV of greater than 0.9; and a process for its production having high IV lift rate during SSP processing.

24 Claims, 9 Drawing Sheets

(56) References Cited

FOREIGN PATENT DOCUMENTS

| JP | 2009-280797 A | 12/2009 |
|---|---|---|
| WO | WO 2006/059608 A1 | 6/2006 |
| WO | WO 2006/127698 A2 | 11/2006 |
| WO | WO 2006/127698 A3 | 11/2006 |
| WO | WO 2011/130396 A1 | 10/2011 |

OTHER PUBLICATIONS

Office Action issued Jul. 23, 2014 in Chinese Patent Application No. 2011800296506.X (with English language translation).
Office Action issued Aug. 12, 2014 in Japanese Patent Application No. 2013-505091 (with English language translation).
International Search Report and Written Opinion issued Jul. 19, 2011, in PCT/US2011/032300.
Combined Taiwanese Office Action and Search Report issued Jan. 21, 2015 in Patent Application No. 100113046 (with English language translation).
Chinese Office Action issued in connection with corresponding Chinese Patent Application No. 201180029506.X, filed Apr. 13, 2011.
Mexican Office Action issued May 18, 2015 in connection with Mexican Application No. MX/A/2012/011793, filed Apr. 13, 2011.
Third Chinese Office Action issued Feb. 9, 2015 in connection with corresponding Chinese Patent Application No. 201180029506.X, filed Apr. 13, 2011.
Mexican Office Action issued Oct. 27, 2015 in connection with corresponding Mexican Patent Application No. MX/A/2012/011793, filed Apr. 13, 2011.
Mexican Office Action issued Apr. 12, 2016 in Mexican Application No. MX/a/2012/011793, filed Oct. 15, 2012.

* cited by examiner

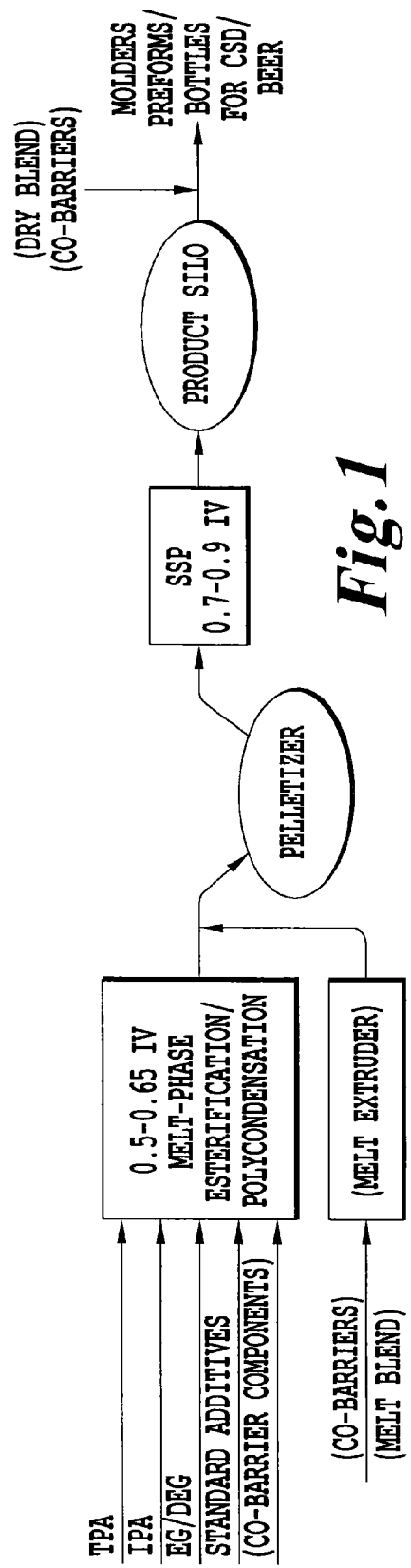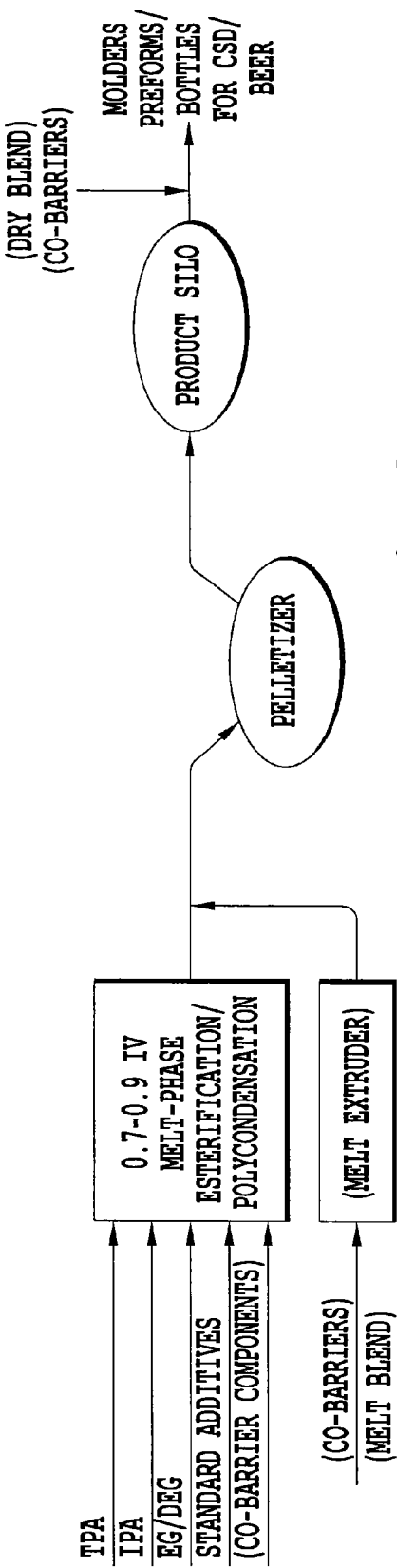

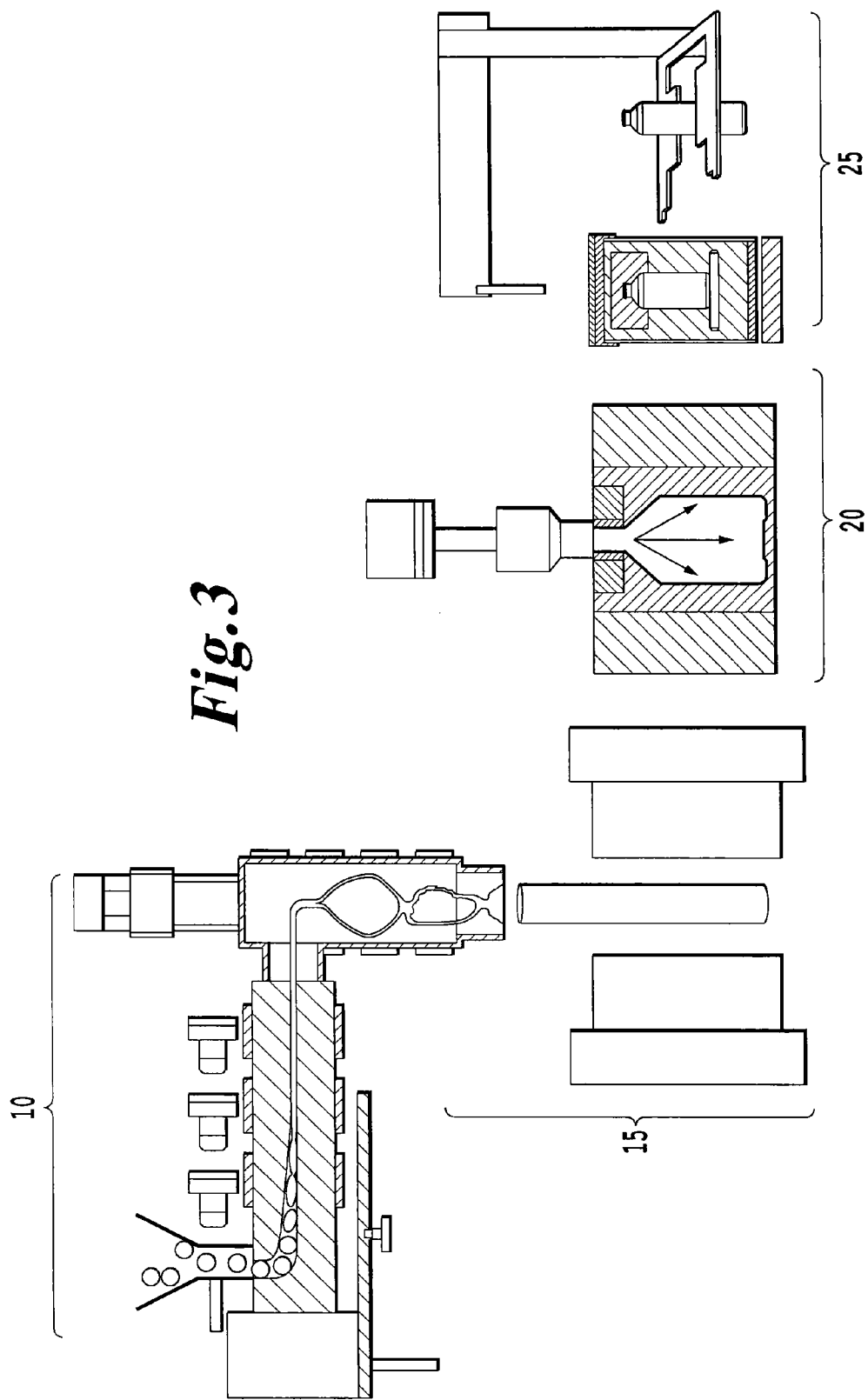

ULTRA-HIGH IV POLYESTER FOR EXTRUSION BLOW MOLDING AND METHOD FOR ITS PRODUCTION

The present application is a Divisional application of Ser. No. 12/760,030.

BACKGROUND OF THE INVENTION

1. Field of the Invention

The invention relates to an ultra-high intrinsic viscosity (IV) polyester resin useful in extrusion blow molding, and a method for its production.

2. Description of the Related Art

Polyester resins including resins such as poly(ethylene terephthalate) (PET), poly(butylene terephthalate) (PBT), poly(ethylene naphthalate) (PEN), poly(trimethylene terephthalate) (PTT), and poly(trimethylene naphthalate) (PTN), are conventionally used as resins in the manufacture of containers such as beverage bottles. Properties such as flexibility, good impact resistance, and transparency, together with good melt processability, permit polyester resins to be widely used for this application. The term resin as it is used herein includes all of the aforementioned materials.

The starting feedstocks for polyester resins are petroleum derivatives such as ethylene, which is obtained from petroleum or natural gas, and para-xylene, which is typically obtained from petroleum.

Polyester resins are generally made by a combined esterification/polycondensation reaction between monomer units of a diol (e.g., ethylene glycol (EG)) and a dicarboxylic acid (e.g., terephthalic acid (TPA)). The terms carboxylic acid and/or dicarboxylic acid, as used herein, include ester derivatives of the carboxylic acid and dicarboxylic acids. Esters of carboxylic acids and dicarboxylic acids may contain one or more C1-C6 alkyl groups (e.g., methyl, ethyl, propyl, isopropyl, butyl, iso-butyl, tert-butyl, pentyl, hexyl and mixtures thereof) in the ester unit, for example, dimethyl terephthalate (DMT).

In conventional esterification/polycondensation processes, polyester may be formed, for example, by first producing a prepolymer of low molecular weight and low intrinsic viscosity (IV) (e.g., a mixture of oligomers), for example, by reacting a diol and a dicarboxylic acid in a melt phase reaction. The formation of the oligomers may be carried out by reacting a slurry of diol and dicarboxylic acid monomer units in an esterification reactor. EG may be lost to evaporation during the esterification reaction which may be carried out at high temperatures. Therefore the slurry of diol and dicarboxylic acid may contain an excess of EG, for example the diol and dicarboxylic acid may be present in a molar ratio of from about 1.2 to about 2.5 based on the total glycol to total di-acid. Further pre-polycondensation and polycondensation of the oligomers can be carried out to provide a resin mixture having an IV of from 0.50 to 0.65. Such resin mixtures are suitable in various applications such as fibers/filaments, fiber chips, or bottle-resin precursors. Amorphous clear base chips having an IV of from 0.50 to 0.65 may be subjected to solid-state polymerization (SSP) to increase the molecular weight (e.g., to an IV of from 0.72 to 0.76 for water bottle applications, 0.81 to 0.85 for CSD/Beer bottles, etc.). The solid-state polymerization (SSP) process unit can result in the resin undergoing crystallization which forms opaque pellets.

A continuous polyester melt-phase polycondensation process usually consists of three reaction steps: (i) esterification to form low molecular weight oligomers, (ii) pre-polymerization of the oligomers to form a pre-polymer, and (iii) polycondensation to form a polymer with an intermediate molecular weight or intrinsic viscosity (e.g., a target intrinsic viscosity of from 0.50 to 0.85).

The three reaction steps (i), (ii), and (iii) above, can be carried out to achieve the target intrinsic viscosity in from 2 to 6 reactors using existing melt-phase process technology. In general, esterification is conducted in one or two vessels to form a mixture of low molecular weight oligomers with a low degree of polymerization (e.g., about up to 5 to 10 monomer unit pairs reacted). The oligomers are then pumped to one or two pre-polymerization vessels where higher temperatures and lower pressures aid in removing water and EG. The degree of polymerization then increases to a level of 10 to 40 repeating units. The temperatures are further increased and pressures are further reduced in the final one or two vessels to form a polymer ready to be cut into pellets for example, or to be spun directly into fibers or filaments.

Esterification and pre-polymerization vessels may be agitated. Polycondensation vessels (e.g., finishers, wiped-film reactors etc.) may have agitators designed to generate very thin films. Temperatures and hold-up times are optimized for each set of vessels to minimize the degradation and other side reactions. Some by-products that may be generated by the polyester melt phase reaction include diethylene glycol (DEG), acetaldehyde, water, cyclic oligomers, carboxyl end groups, vinyl end groups, and anhydride end groups.

Both time and temperature are two variables that are preferably controlled during an esterification/polycondensation reaction. With higher reaction temperatures, the total reaction time is significantly reduced and less residence time and/or fewer reactors are needed.

Alternatively to such a continuous production method, polyesters may be prepared using a batch method. In a batch method the diol and dicarboxylic acid units are mixed together in a single reactor. In some cases more than one reactor (e.g., reaction vessel) may be used if necessary. The diol/dicarboxylic acid mixture is heated to cause the monomer units to undergo a condensation reaction. The by-products of the condensation reaction may include water or an alcohol. By conducting the reaction under reduced pressure or by subjecting the reaction mixture to reduced pressure during the final stages of the reaction, volatile by-products of the reaction can be removed thus driving the reaction to completion.

Certain physical and chemical properties of polymeric materials are negatively affected by long exposure to elevated temperature, especially if the exposure is in an oxygen-containing atmosphere or at temperatures above, for example, 250° C. Conventional methods for preparing polyester resins such as PET may suffer from disadvantages associated with the need to carry out a solid state polymerization (SSP) which subjects the resin to a long heat history and/or may require high capital expenditure.

A conventional process for producing polyester resins for container applications including melt-phase polycondensation and solid-state polymerization is shown schematically in FIG. 1 wherein the monomer components of a polyester resin such as PET are mixed in a melt-phase esterification/polycondensation reactor. The reaction is carried out to provide a molten resin having an intrinsic viscosity (IV) of from 0.50 to 0.65. The molten product obtained by the melt-phase esterification/polycondensation is then subjected to a polymer filtration.

The melt-phase esterification/polycondensation is typically carried out in a plurality of reactors. Therefore, the monomers may be added to a first esterification reactor to form a low IV material. As the oligomers pass through the remaining reactors, the IV is subsequently raised as the polycondensation reaction proceeds sequentially through a series of reactors. The material in molten form is subjected to solidification and pelletizing. The molten material may be solidified by passage of strands or filaments of the material formed by pumping the material through, for example, a die with a series of orifices. As the molten polyester resin is passed through an orifice, a continuous strand is formed. By passing the strands through water, the strands are immediately cooled to form a solid. Subsequent cutting of the strands provides pellets or chips which, in a conventional process, are then transferred to a solid-state polymerization stage (i.e., SSP).

In conventional processes for preparing polyester resins and even in some processes which avoid the use of a solid-state polymerization after polymerization is complete, the molten polymerized resin may be pumped through a die to form multiple strands. The molten resin exiting from the die is quickly quenched in water to harden the resin. As a result of the quick cooling (e.g., water quench) the molten polyester does not have time to crystallize and is solidified in an amorphous state. Solidified polyester strands, or pellets derived from cut strands, are clear, transparent and in an amorphous state.

Solid-state polymerization (SSP) is an important step in some conventional processes used to manufacture high molecular weight polyester resins for bottle, food-tray, and tire-cord applications. The clear amorphous pellets (0.50 to 0.65 IV) produced by conventional melt polycondensation reaction processes may be further polymerized in the solid state at a temperature substantially higher than the resin's glass transition temperature but below the resin's crystalline melting point. The solid state polymerization is carried out in a stream of an inert gas (usually nitrogen under continuous operation) or under a vacuum (usually in a batch rotary vacuum dryer). At an appropriate SSP temperature, the functional end groups of the polymer (e.g., PET) chains are sufficiently mobile and react with one another to further increase the molecular weight.

The SSP may include several individual reactors and/or processing stations. For example, the SSP may include a pre-crystallization step wherein the chips and/or pellets are transformed from an amorphous phase into a crystalline phase. The use of a crystalline phase polyester resin is important in later steps of the SSP because the use of amorphous polyester chips may result in clumping of the pellets since an amorphous state polyester resin may not be sufficiently resistant to adherence between pellets and/or chips. The SSP process further includes a crystallizer (e.g., crystallization step), a pre-heater, a cooler, and an SSP reactor.

One of the disadvantages encountered is that typical PET resins produced by melt polymerization have an intrinsic viscosity (IV) of around 0.50 to 0.65. When the IV is raised further by SSP, there is an initial increase in IV (known as the "lift rate"), which begins to level out around an IV of 0.90 to 1.0. Even these IV levels take a long time to achieve with conventional resins under SSP, often approaching 24 to 48 hours of SSP time. This results in excessive heat history, elevated melting temperature, and often poor color characteristics, as well as high production costs due to the energy required and slow production.

The production of a polyester resin such as PET may be carried out directly from a melt phase of the monomer units without any final solid-state polymerization. For example, a batch process may be carried out at a sufficient temperature, for a sufficient time and at a sufficient pressure to drive the polycondensation reaction to completion thus avoiding the need for any subsequent finishing (e.g., final reaction).

Some manufacturing processes do not include an SSP. Processing a polyester resin directly from a melt phase condensation to obtain pre-forms for stretch blow molding applications is described in U.S. Pat. No. 5,968,429 (incorporated herein by reference in its entirety). The polymerization is carried out without an intermediate solidification of the melt phase and permits the continuous production of molded polyester articles (e.g., pre-forms), from a continuous melt phase reaction of the starting monomers.

After pre-crystallization, the chips and/or pellets may be subjected to a final crystallization. A final crystallization may include, for example, proper heating of the chips (pellets, pastilles, granules, round particles, etc.) at appropriate temperatures. Once the polyester resin is in a crystallized state, the pellets and/or chips are preheated and ready for transfer to the top of a counter-flow SSP reactor (parallel to the pre-heater) via a pneumatic system (e.g., Buhler technology). If a tilted crystallizer is stacked above the SSP reactor, the hot/crystallized chips then enter the SSP reactor by the rotating screw of the crystallizer (e.g., Sinco technology). The SSP reactor can be considered as a moving bed of chips that move under the influence of gravity. The chips have a slow down-flow velocity of from 30 to 60 mm/minute and the nitrogen has a high up-flow velocity of about 18 m/minute. A typical mass-flow ratio of nitrogen to PET is in the range of 0.4 to 0.6. In a gravity-flow reactor, the pellets and/or chips are subjected to elevated temperatures for periods of up to 15 hours. The heating and nitrogen sweeping through the gravity-flow reactor will drive the polycondensation reaction and result in longer chain lengths and, concurrently, a higher IV of the resins.

After passing through the gravity-flow reactor, pellets and/or chips of a wide range of IV can be formed, e.g., having an average IV of about 0.80-0.84 dL/g, e.g., for CSD/Beer. The pellets and/or chips have an opaque characteristic due to their crystallinity. The crystalline material is transferred to a product silo for storage and/or packaging. The finished product in a crystalline state and having an IV of about 0.80-84 dL/g, e.g., for CSD/Beer, can be further mixed with other co-barrier resins (powders, granules, pellets, pastilles, etc.) by molders or processors who purchase the polyester resins for manufacturing, for example, bottles and/or containers.

Thus, in a conventional process, a melt-phase polycondensation process may be used to make clear amorphous pellets (typically, 0.50 to 0.65 IV) as precursors to bottle resins. The amorphous pellets are first pre-crystallized, crystallized, and/or preheated, then subjected to SSP in a gravity flow reactor (e.g., a reactor that is not agitated). After crystallization, the resin pellets become opaque and do not stick together if the temperature of SSP is at least 10° C. below the onset of the melting temperature of the resin pellets. In a direct high IV melt process as shown in FIG. 2, only the melt process (no SSP) is used to make a variety of bottle resins (e.g., 0.72 to 0.78 IV for water bottles, 0.81 to 0.87 IV for CSD/Beer bottles) as desired. In a direct high IV melt process, a finisher (e.g., a wiped- or thin-film evaporator) may be used to effectively and rapidly remove the reaction by-products such as EG (major), water, acetaldehyde, and so on. Immediate removal of EG/water under high temperatures drives the polycondensation reaction equilibrium toward the polymer side.

PET or other polyester resins are known to have hygroscopic behavior (e.g., absorb water from the atmosphere), so pellets obtained by cutting water-quenched strands contain significant quantities of water. Conventionally, the pellets may be dried by passing dry air over the pellets or by heating. Heating for an extended period at an elevated temperature may lead to problems because the amorphous polyester (e.g., PET) pellets may have a tendency to stick to one another.

Because of the challenge of achieving high IV with PET based polyesters in a cost effective, time-efficient manner, and due to the increased crystallinity that often results from the thermal history, PET resins have typically been limited to use in injection stretch blow molding to prepare products such as soda bottles or other thin wall containers. Thicker walled products, such as "handleware", have typically been formed by extrusion blow molding (EBM) with PETG copolymer, PVC, polyethylene, or polypropylene resins, due to the ability to achieve high enough IV and melt strength with the requisite characteristics, at acceptable cost. "Handleware" is the term used for thicker walled containers (thickness of container wall being 25-55 mils) typically having handles (with handles typically having thickness of 30-40 mils), such as juice, milk, or laundry detergent bottles, and other such containers. (See FIGS. 8, 9, 10, 11 for details of a typical "handleware" container.)

There is a desire to provide PET resins that could be used to produce "handleware" through EBM, in place of PETG copolymer, PVC, polyethylene or polypropylene, with comparable or better costs and providing clearer and colorless containers (which cannot be readily produced with some other materials).

SUMMARY OF THE INVENTION

Accordingly, one object of the invention is to provide an ultra-high IV polyester product having low crystallinity and suitable for use in a variety of high melt strength end uses.

Another object of the invention is to provide a method of producing such a high IV polyester product.

Another object of the invention is to provide a method for producing a handleware container that includes forming a molten parison from solid polyester resin and then forming the handleware container from the molten parison.

Another object of the invention is to provide a method of producing such a high IV polyester product using less energy and having a faster production time.

Another object of the invention is to provide an ultra-high IV polyester resin that can be used in high melt strength resin applications, including, but not limited to, injection blow molding, extrusion blow molding, pipe extrusion, and profile extrusion.

These and other objects of the invention have been satisfied, either individually or in combinations thereof, by the discovery of a method for producing an ultra-high intrinsic viscosity (IV) polyester resin having a final IV ($IV_f$) of at least 0.9 dL/g, comprising:

solid-state polymerizing a polyester starting material having a starting IV ($IV_{st}$) meeting the following relationship:

$$0.65 \text{ dL/g} < IV_{st} < 0.9 \text{ dL/g};$$

wherein the polyester starting material is a polyethylene terephthalate polymer, optionally containing one or more comonomers in amounts up to 30 mol %, wherein the polyester starting material has been prepared by melt polymerization up to the $IV_{st}$ with no more than 0.05 dL/g of IV lift due to solid-state polymerization, and wherein the polyester starting material is in solid form as a resin particle having been subjected to latent heat crystallization upon formation of the resin particle, and having a variation of IV of no more than 0.05 dL/g across any dimension of the resin particle;

and a parison and final article produced therefrom.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a schematic of a conventional melt-phase process with subsequent solid-state polymerization (SSP);

FIG. 2 shows a schematic of a non-SSP direct high-IV melt process used to make a starting material resin for one embodiment of the present invention;

FIG. 3 shows a schematic of a typical extrusion blow molding (EBM) process;

DETAILED DESCRIPTION OF THE PREFERRED EMBODIMENTS

Figure 4:
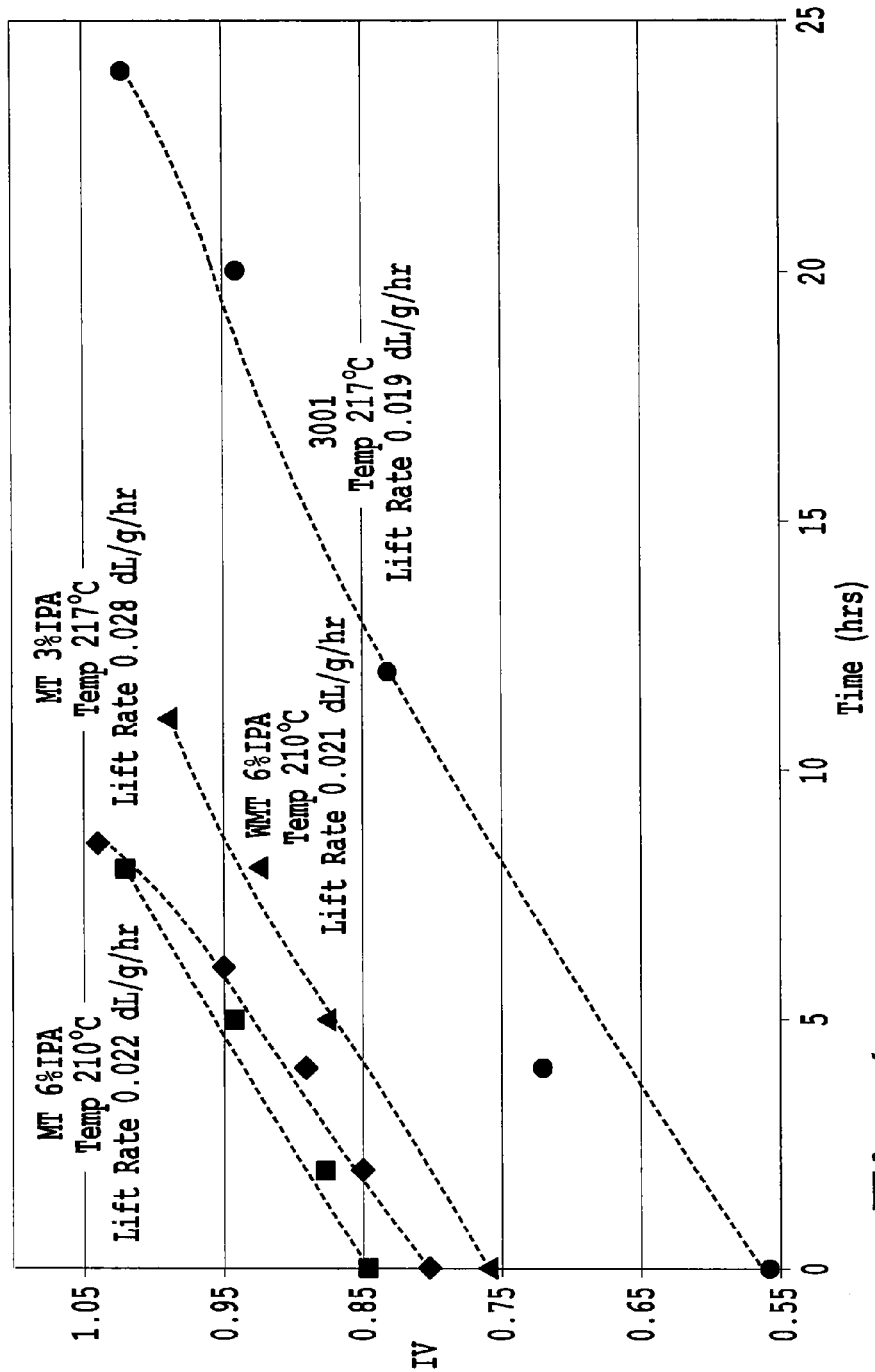
FIG. 4 provides a graphical representation of IV change during SSP processing in preparation of ultra-high IV PET resins of the present invention (diamond, square, and triangle symbols) as compared with conventional resins (circle symbols)

The present invention relates to an ultra-high IV polyester resin suitable for use in high melt strength applications, including, but not limited to, extrusion blow molding (EBM), injection blow molding, and profile extrusion, and its method of production. Within the context of the present invention, the term "ultra-high IV" refers to a polyester resin having an IV of 0.9 or higher, preferably 1.1 or higher, more preferably 1.2 or higher, most preferably 1.3 or higher. Such ultra-high IV resins are also known in the art as high melt strength resins. The ultra-high IV polyester resin is produced by solid-state polymerization (SSP) of a starting resin having an IV of 0.65 to 0.90, preferably 0.70 to 0.85, more preferably 0.72 to 0.80, that is prepared by a melt process meeting one or more conditions selected from the group consisting of (i) without solid state polymerization, (ii) high IV melt polycondensation, (iii) having underwater pelletizing and (iv) having direct latent heat crystallization, such as that described in U.S. Published Application 2007/0128389 and U.S. Published Application 2007/0248778, the entire contents of each of which are hereby incorporated by reference. In the process of the present invention, this starting polyester resin is subjected to SSP to raise the IV to a level of 0.9 or higher, preferably 1.1 or higher, more preferably 1.2 or higher, most preferably 1.3 or higher. The starting resin preferably contains a level of isophthalate units (as percent of the total starting di-acid monomer) of 1% or higher, preferably 2% or higher, more preferably 3% or higher, most preferably 4% or higher, in order to reduce the crystallinity and enhance the melting characteristics of the product formed through the SSP process.

The present invention ultra-high IV polyester can be processed by any method of processing a resin, e.g., by melting the resin, forming a shaped article from the molten resin, and cooling the shaped article to form a solid shaped article. Processing includes any method by which the polyester resin is transformed from a solid form to a flowable and/or plastic form. The transforming may include heating the polyester resin beyond the glass transition temperature then forming a shaped solid article from the heated polyester resin. Processing further includes any method by which a solid polyester resin is heated above its glass transition temperature and/or melt temperature and is subsequently and/or concurrently formed into a shaped article, particularly those processes that require the use of a high melt strength resin, including: injection molding, reaction injection molding (RIM), stretch blow molding, injection blow molding, recycling, extrusion molding (including EBM), compression molding, thermoforming, and such methods for processing polyester resins as described in "PET Packaging Technology," by David W. Brooks and Geoff Giles (2002), the portions of which describe processing methods for polyester resins and/or PET resins are incorporated herein by reference. Preferred processing includes injection (blow) molding, sheet and film extrusion, profile extrusion, extrusion blow molding (EBM) and compression molding; most preferably EBM.

The extrusion blow molding (EBM) process is the most common process for producing plastic bottles, particularly large plastic bottles. The basic extrusion blow molding process is shown in FIG. 3, and comprises plasticizing or melting of the resin in an extruder (10), forming the parison by extrusion of the molten resin through a die into a mold (15), blowing the parison to fit the shape of the bottle mold and cooling (20), then deflashing of the blown bottle and ejection of the finished product (25). Variations can include multiple extruders for coextrusion of two or more materials for multilayer bottle structures, parison programmer to shape the parison to match complex blown product shapes and wall thickness, and multiple mold clamp systems to improve output through the use of multiple molds.

In the EBM process, an extruder melts, mixes, and feeds a homogeneous molten polymer into a die head that forms the molten hollow plastic tube, called a parison, used in blowing hollow containers or other hollow products. The first step is extrusion of a hollow plastic parison which is usually in a downward direction for making bottles. Next, the two halves of the mold close on the parison, capturing it as it is cut off from the extruder by a cold or heated cut-off knife. A blow pin or a needle is inserted and air is blown into the mold, expanding the parison. In some cases the blown pin cooled by water, assists in forming the thread finish by compressing the thread finish section into the mold (neck calibration), rather than simply blowing it in. This results in a smooth interior in the finish region. In the needle blow case, the needle is inserted into a part of the molded object that is trimmed off forming the final container shape, and the inside of the finish is formed only by air. The mold is cooled, usually with water, to solidify the plastic. When the container is cool enough to maintain its shape, it is ejected from the mold.

The flash is trimmed from the container neck and bottom, as well as from other areas that are pinched off, for instance to form handles or offset necks. The mark left from the removal of the flash serve as an easy means for identification of extrusion blow-molded containers. Usually, this is easiest to see on the bottom of the container. It typically appears as a rough area along the mold parting line, centered in the middle of the bottom and running half or so of the distance to the heel of the bottle. It is also possible, on careful examination, to identify the roughness at the top of the finish, or on other areas where flash was trimmed.

The flash, after being trimmed, is usually granulated in a closed-loop fashion with the extruder and is immediately fed back into the drying hoppers on the extruder at a controlled rate, mixed with the virgin resin. The use of regrind can be problematic for heat-sensitive resins like PVC, especially if the proportion of the flash is high. However, with the present invention ultra-high IV PET, there is no practical limit for regrind levels because it is a thermally stable resin.

The process of extruding a parison can be continuous or intermittent. For intermittent extrusion, the melt from the continuously rotating extruder may be fed into an accumulator, from which it is periodically ejected, or a reciprocating extruder like those used for injection molding may be used. Continuous extrusion is preferred for most packaging applications. It provides higher productivity and reduces thermal degradation, since the melt is not held up. Intermittent extrusion is commonly used for the production of very large blown containers, where a large parison must be produced in a very short time, and in the production of gasoline tanks for automobiles.

As the extrudate leaves the die, parison drawdown can occur. The stress exerted by the parison's own weight tends to collapse the parison walls and create axial thinning of the walls, thus creating thin spots in the final part. The present invention ultra-high IV PET prevents this drawdown from occurring, and thus prevents axial thinning of the walls.

In the production of EBM products such as handleware, one problem encountered previously with attempts to use polyesters was the inability to achieve the high IV levels necessary without a concurrent increase in crystallinity. This increase in crystallinity results in poor resin melting characteristics as well as the potential for rapid re-crystallization and haze formation during the cooling of the EBM product. Now however, clear EBM products, particularly clear handleware, can be formed from conventional polyester resin compositions with the use of the present invention ultra-high IV polyesters, without the formation of this crystalline haze.

In the extrusion process, molten plastic is pushed through a die with a cross section that shapes the plastic. The plastic is then drawn through a cooling apparatus, cut into sections or rolled up. Extrusion can only produce parts that have a continuous cross section. Some common parts that are extruded are pipe, vinyl siding, weed trimmer line, sheet, and film. Extrusion is a continuous process and can produce parts of any length.

Profile Extrusion is used to prepare solid parts with cross-sectional shapes other than round rods or flat sheets are called profiles. Pipe and tubing is produced by extruding a circular, hollow cross section.

The measurement method for determining solution intrinsic viscosity (IV) of polyester (e.g., PET) resins is conventionally known. Solution IV can be measured at 0.50% concentration of the resin in a 60/40 (wt. %/wt. %) phenol/1,1,2,2-tetrachloroethane solution by means of a glass capillary viscometer. Conditions for measuring solution IV are described in ASTM D 4603-03 (approved on Mar. 10, 2003 and published in April 2003, incorporated herein by reference in its entirety). The solution IV of the co-barrier resins described herein can also be measured with the same method used to determine solution IV for polyester resins.

The glass transition temperature of the polyester resin used as a starting material (hereafter "starting material resin") in the invention is not restricted and may be defined or influenced by the degree of polymerization and/or co-monomer content of the polyester resin (e.g., the number of polymerized monomer units making up the polymer chain) and/or the molecular weight distribution of a mixture of different polymers of different polymerization degree (polydispersity) and/or the identity and quantity of the monomer or co-monomer units of the polyester resin. Preferably a polyester resin having a narrower molecular weight distribution is used because it may show less degradation and a more stable IV upon processing than a polyester resin having a broad molecular weight distribution.

The glass transition temperature (Tg) of the starting material resin is preferably from 75 to 90° C., more preferably from 80 to 85° C. and most preferably about 82° C. The Tg of resin compositions containing additives may have glass transition temperatures higher or lower than those mentioned above by as much as 5° C.

The polyester starting material of the invention may include, but are not limited to, polyester synthesized from aliphatic, aromatic or cyclic (aliphatic or aromatic) dicarboxylic acids, or an aliphatic, aromatic or cyclic (aliphatic or aromatic) ester, with an aromatic, aliphatic or cyclic (aliphatic or aromatic) diol; or an esters prepared from two or more aliphatic, aromatic or cyclic (aliphatic or aromatic) esters. Examples of polyesters include, but are not limited to, polyethylene terephthalate, polyethylene naphthalate, polyethylene isophthalate, polypropylene terephthalate, polybutylene terephthalate, poly(1,4-cyclohexylene dimethylene terephthalate) and polyethylene-2,6-naphthalene dicarboxylate, and mixtures thereof. Copolymers, blends and mixtures thereof are also included. Preferred embodiments of the present invention use polyethylene terephthalate polymers having copolymerized therewith from 0 to 5 wt % of isophthalic acid (or the dialkyl isophthalate counterpart, depending on whether the polyester is produced from a terephthalic acid or dimethyl (or dialkyl) terephthalate based process) and from 1 to 3 wt % of diethylene glycol.

Dicarboxylic acids include, but are not limited to, aromatic dicarboxylic acids, such as terephthalic acid, isophthalic acid, phthalic acid and 2,6-naphthalenedicarboxylic acid; aliphatic dicarboxylic acids, such as adipic acid, azelaic acid, sebacic acid and decanedicarboxylic acid; and alicyclic dicarboxylic acids, such as cyclohexanedicarboxylic acid. Diols include, but are not limited to, aliphatic diols such as 1,4-butanediol, 1,3-propanediol, 1,6-hexanediol, monoethylene glycol, diethylene glycol, triethylene glycol and polyethylene glycol; alicyclic diols, such as 1,4-cyclohexanedimethanol; and aromatic diols such as bisphenol A. These diacids and diols may be used alone or in combination of two or more.

Other polyester components include, but are not limited to, phthalic anhydride, trimellitic acid, pyromellitic acid, dimeric acid and 5-sodiumsulfoisophthalic acid.

Suitable catalysts can be any catalyst for polymerizing polyesters, including, but not limited to, catalysts based on antimony, titanium, germanium, zinc or combinations thereof.

In a preferred embodiment, the starting material resin is in the form of a solid particle and has a substantially uniform IV distribution across all dimensions of the particles. Conventional resins in the form of solid particles made with conventional solid-state polymerization may have a substantial intrinsic viscosity gradient when in the form of a chip or pellet. A chip or pellet having an IV gradient may have an IV that varies across the dimension of the pellet and/or chip. For example, a particular pellet of polyester resin may have an IV of 0.9 when measured at the exterior of a pellet or chip and an IV that is different from the IV measured at the interior of the pellet and/or chip (e.g., there may be an IV gradient of as much as 0.20 to 0.30 IV dL/g across the dimension of the chip and/or pellet). Such an IV gradient normally does not affect the overall or average IV of the polyester resin when measured in the bulk. However it may introduce variability into the IV determination of small samples of the polyester resin if there is an insufficient amount of polyester resin in the sample and thus the sample does not provide a representative cross-section of materials present in the polyester pellets and/or chips.

The existence of the IV gradient in a conventional solid form resin may be due to solid-state polymerization during which the resin particles are heated in the solid form and ethylene glycol may be formed and released (e.g., as the resin undergoes further condensation and chain lengthening). If the ethylene glycol is slow to diffuse out of the resin its presence may slow the chain lengthening reaction.

It is thought that during solid-state polymerization the exterior of the resin particle is subjected to a longer heat history because it is the first portion of the solid form resin to be heated in the solid-state polymerization process. Ethylene glycol formed by the polymerization is more likely to escape from the periphery of the resin particle (e.g., pellet or chip) due to a tendency to more easily diffuse out of the particle in comparison to ethylene glycol present in the center of the resin particle. Often, when one starts with a polyester resin having an IV of 0.50 to 0.65 dl/g, and subjects that particle to SSP processing, there is an initial IV lift whereby the rate of IV increase per unit time begins to decrease after approximately 16-24 hours of processing, and levels off around 0.90 to 1.10 IV after about 24-40 hours. This leveling off is thought to be at least partially due to the increasing crystallinity of the resin pellet/particle periphery due to its longer heat history causing the periphery to be less "porous" with respect to ethylene glycol migration which in turn slows down of the escape of ethylene glycol from the pellet/particle center and retards the condensation reaction in the internal central areas.

In contrast with conventional resins, the starting material resin used in the process of the present invention has not been previously subjected to conventional (external heating) crystallization and/or solid-state polymerization and preferably has minimal (no more than 0.05 dl/g) IV gradient within the resin particle or substantially less intrinsic viscosity variation (e.g., gradient) across the resin particle. The IV of the starting resin of the present invention may, in one aspect of the invention, vary by no more than 0.05, preferably no more than 0.03 across any dimension of the resin particle.

An additional advantage of the present invention ultra-high IV polyester, is that the resin preferably does not contain any phthalate plasticizer. Di (2-ethylhexyl) phthalate, or DEHP, is the most commonly used of a group of related chemicals called phthalates or phthalic acid esters. The greatest use of DEHP is as a plasticizer for polyvinylchloride (PVC) and other polymers including rubber, cellulose and styrene. PET in general, and the present invention ultra-high IV polyester specifically, usually does not contain DEHP or any other plasticizer, and does not require such plasticizers for effective use of the polyester. Since phthalate plasticizers, and their use in other conventional resins such as PVC, are coming under increased scrutiny as a potential health hazard in plastic articles, this makes the present invention ultra-high IV polyester a good replacement for such phthalate containing resins in high end molding processes. Additionally, another chemical/monomer that is commonly used in polycarbonates, bisphenol A, is not necessary in the present invention ultra-high IV PET.

A further advantage of the present invention ultra-high IV polyester is that the resulting molded products (such as gallon size detergent bottles) qualify as standard bottle grade PET and can be readily recycled in the same recycle stream as PET beverage bottles bearing the recycling symbol and identifier "1" or "PETE".

In a preferred embodiment, the starting material resin of 0.65 to 0.90 IV has been crystallized directly from the melt by the method of underwater pelletization and latent heat crystallization. The ultra-high IV polyester resin of the invention is prepared by conventional SSP processing of the starting material resin. The present inventors have found that when the melt-polymerized and latent heat crystallized starting material resin has an IV in the range of 0.65 to 0.90, the IV lift found during SSP processing is surprisingly higher that the IV lift observed during SSP processing of conventional lower IV resins (IV range of 0.50 to 0.65). FIG. 4 provides a comparison of the IV increase during SSP processing for a conventional PET resin, having an initial IV of 0.56, compared to three different starting material resins for the present invention, having 3% or 6% of IPA co-monomer present, and starting IV's of from 0.75 to 0.85. When the 3% IPA starting material resin was subjected to SSP processing at the same temperature as the conventional resin (217° C.), the IV lift rate for the 3% IPA resin was nearly 50% higher than the conventional resin (0.028 dL/g/hr compared to 0.019 dL/g/hr), even though the 3% IPA starting material resin began at an IV of 0.80 compared to the 0.56 IV of the conventional PET resin. Previous prior art would suggest that the starting material resin with the higher IV would be more difficult to SSP as compared with a starting material resin with the lower IV and thus they we expected to see a lower measured SSP lift rate. But surprisingly this was not what was observed for these specially prepared high melt IV, latent heat crystallized starting material resins. Each of the 6% WA starting material resins gave SSP IV lift rates of 0.021-0.022 dL/g/hr, still nearly 10-15% higher than the SSP IV lift rate of the conventional PET resin. Even more importantly, this increased SSP IV lift rate was observed even though the SSP processing of the 6% IPA starting material was performed at 210° C., compared to the 217° C. of the conventional PET resin containing 2-3% IPA. Not only did the present invention provide a faster SSP IV lift rate, but the rate appeared to stay nearly constant throughout the SSP processing of the resin, up to a stopping IV of 1.2 to 1.3. This gave an SSP time that was significantly shorter than that required to reach such an IV level using conventional resins. We surmise the enhanced SSP lift rate is due to a combination of factors including (i) lower and more uniform degree of crystallization of the starting material, (ii) more uniform molecular weight distribution and therefore more uniform distribution of reactive end groups in the starting material, and/or (iii) enhanced diffusivity of condensation reaction by-products as a result of a more open crystalline structure produced by latent heat crystallization to a low level of crystallinity.

In a preferred embodiment of the invention, the processing of the invention includes heating the ultra-high IV polyester resin above its melting temperature. Further preferably, the polyester resin is heated to the point where it is a free-flowing liquid. In a further preferable embodiment of the invention, the polyester resin is subjected to high shear stress while heating. High shear stress conditions are those conditions which may be observed or created in processes such as conventional injection molding and/or extrusion which result in melting and mixing of the polyester resin during processing.

Conventionally, a resin preform is transformed to a bottle or a container by blow-molding. Blow molding, also known as blow forming, is a manufacturing process by which hollow plastic parts are formed. It is a process used to produce hollow objects from thermoplastic. In general, there are three main types of blow molding: extrusion blow molding, injection blow molding, and stretch blow molding. The blow molding process begins with melting down the plastic and forming it into a parison or preform. The parison is a tube-like piece of plastic with a hole in one end in which compressed air can pass through.

The basic process has two fundamental phases. First, a preform (or parison) of hot plastic resin, often in a somewhat tubular shape, is created. Second, a pressurized gas, usually air, is used to expand the hot preform and press it against a mold cavity. The pressure is held until the plastic cools. This action identifies another common feature of blow molded articles. Part dimensional detail is better controlled on the outside than on the inside, where material wall thickness can alter the internal shape. Once the plastic has cooled and hardened the mold opens up and the part is ejected.

In extrusion blow molding (EBM) plastic is melted and extruded into a hollow tube (a parison). There are two main categories of extrusion blow molding processes: continuous and intermittent.

In continuous EBM, the parison is extruded continuously and the individual parts are cut off by a suitable knife. Types of equipment for continuous EBM may be categorized as follows: rotary wheel blow molding systems and shuttle machinery. Examples of parts made by the EBM process include dairy containers, shampoo bottles, hoses/pipes, and hollow industrial parts such as drums.

Intermittent extrusion blow molding may be also called shot extrusion. Parison shot extrusion is accomplished by means of a reciprocating screw almost identical to those used in injection molding machines. In intermittent blow molding there are two main types of processes: straight intermittent is similar to injection molding whereby the screw turns, then stops and pushes the melt out. With the accumulator method, an accumulator gathers melted plastic and when the previous mold has cooled and enough plastic has accumulated, a rod pushes the melted plastic and forms the parison. In this case the screw may turn continuously or intermittently.

The processing may be carried out on a polyester resin that is dried or undried. A dried polyester resin is a crystallized resin that has been heated in its solid state to a temperature above the glass transition temperature in a dehumidifying environment. A dried polyester resin contains less than 1,000 ppm, preferably less than 500 ppm, more preferably less than 50 ppm, especially preferably less than 25 ppm of water based upon the weight of the water relative to the total weight of the resin. Drying may also be accomplished by exposing the polyester resin to a dehumidified atmosphere to thereby remove water adsorbed or absorbed by the polyester resin.

Undried polyester resin may be a polyester resin that contains water or a resin that is free of water. A resin that is free of water may be one that is obtained by solidifying a polyester resin liquid obtained directly from a polyester polymerization process in an atmosphere that is substantially free of water (e.g., substantially free of water includes atmospheres that have 99%, preferably 99.5%, more preferably 99.9% by volume free of water vapor). Thus, an undried polyester resin may be one that has not undergone heating in the solid state.

An undried polyester resin may be one that is obtained in the solid form from a polyester polymerization process then stored in an atmosphere that is not inert and/or not dried (e.g., dehumidified). Water vapor present in the atmosphere may absorb onto the surface of the polyester resin and/or may absorb into the matrix of the polyester resin. An amount of water of as much as 5% by weight based upon the weight of the water relative to the total weight of the resin may be present. Preferably, the polyester resin used in the method of the invention is an undried water-free resin or a dried resin.

In a preferred embodiment, the solid form ultra high IV polyester resin is dried before processing by the EBM process of the present invention. The drying may be carried out in a conventional drier by passing dehumidified air over chips and/or pellets of the solid form polyester resin. Preferably the polyester resin is dried in a dehumidified environment for 2 to 10 hours, more preferably 4 to 8 hours and most preferably about 6 hours. The dehumidified gas passing over the polyester pellets and/or chips has a dew point of less than −10° C., preferably less than −20° C., more preferably less than −40° C., even more preferably less than −50° C., most preferably less than −60° C. The dehumidified gas passing over the polyester pellets has a temperature in the range 220 to 400° F., preferably 260 to 360° F., more preferably 300 to 320° F.

Examples of preferred polyester resin starting materials made without solid-state polymerization (less than 0.03 dL/g SSP lift) include those resins described in U.S. Published Application 2007/0128389 and U.S. Published Application 2007/0248778, each of which has been incorporated by reference in its entirety above.

In one embodiment, the starting material resin used in the method of the invention is a resin that is prepared without solid-state polymerization. A resin prepared without solid-state polymerization may include a resin that is made to its final intrinsic viscosity (e.g., that viscosity which is measured on the pellets or the commercially transported form) with less than 0.03 dL/g solid-state polymerization (e.g., heating of the resin in the solid-state at a temperature and for a period of time sufficient for increasing the IV by 0.03 dL/g or more). For example, the resin of the invention is made without solid-state polymerization and has an IV achieved substantially by polymerizing the monomer units in the melt phase. Optionally, the solid form resin thus obtained is not subsequently heated to a temperature at which a further or finishing polymerization may be achieved.

In a preferred embodiments, the starting material resin used in the method of the invention may have a minor degree of polymerization that is at least partially achieved by heating the resin in the solid form after it is made by melt polymerization and isolated in the solid phase. For example, in one embodiment, a resin used in the method of the invention may have an IV of 0.70 and may be derived from a resin having an IV of 0.65 achieved by carrying out polymerization without conventional solid-state polymerization. However, subsequent handling or heating of resin in the solid form, either through a solid-state heating or through other means such as drying at elevated temperature may increase the intrinsic viscosity by an amount of, for example, 0.03 dL/g. Thus, the resin, having a final IV of 0.70, is produced by first forming a resin having an IV of 0.67 without conventional solid-state polymerization then increasing the IV of the resin by a minor amount (e.g., 0.03 dL/g) to thus prepare a resin having a final IV of 0.70. Preferably, the IV of the resin used in the process of the invention is increased by no more than 0.05, preferably 0.04, more preferably, 0.03 after the resin is initially isolated from melt polymerization.

The term without solid state polymerization, as used herein, includes resins that are made by melt polymerization to a first IV then further polymerized in the solid-state to a second IV that is less than 0.03 dL/g higher than the first IV.

The IV of the polyester resin that may be used in the method of the invention may fall within a wide range. For example, the IV of the starting polyester resin may be from 0.6 to 1.0 dL/g, preferably from 0.65 to 0.9, more preferably from 0.7 to 0.85, even more preferably from 0.72 to 0.80, especially preferably about 0.76.

The solid-state polymerization process to which the starting material resin is subsequently subjected to achieve the final product of the invention may include multiple steps such as preheating, solid-state-polymerization, and cooling and may use multiple types of commercially utilized, batch, semi-continuous, or continuous SSP reactors. Such SSP reactors may be agitated or unagitated examples of which may include a vacuum oven, a rotary vacuum dryer, a co- or counter-flow gas-purged horizontal rotary reactor, and a co- or counter-flow gas-purged down-flow vertical reactor. In any other these embodiments the conventional steps of pre-crystallization and crystallization are not required since the starting material resin has already been crystallized shortly after pelletization by a direct latent heat crystallization method. Therefore, the temperature profile of the SSP process may more rapidly achieve the desired reaction temperature as compared with a conventional SSP process. In order to achieve the required ultra high IV for the final product, the steady-state temperature of the SSP process should be in the range of 190 to 230° C., preferably 200 to 225° C., more preferably 210 to 220° C. and most preferably about 215° C. depending on the level of co-monomer in the starting material resin.

In one embodiment of the invention, the polyester resin starting material is in the form of a solid (e.g., a solid-form polyester resin). The initial solid-form polyester resin may be in the form of chips or pellets. The solid-form polyester resin may contain an amount of regrind or recycled polyester of from 0 to 50% by weight based upon the total weight of the polyester resin, preferably the recycled or regrind material is present in an amount of no more than 25% by weight, more preferably no more than 10% by weight, even more preferably no more than 5% by weight, in a most preferred embodiment the solid-form polyester resin is a virgin resin containing no regrind or recycled polyester material and is in the form of distinct solid particles (e.g., pellets and/or chips).

During the EBM manufacture of articles such as bottles, containers, and the like, many individual articles and parts are made that are not of first quality or are otherwise not marketable. It is desirable (if not required) to reuse (e.g., recycle) the resin in such "off-grade" articles. The resin from which off-grade materials are made may be mixed with virgin PET resin to recover to form other articles.

In one embodiment, these articles are ground, chipped or otherwise reduced into smaller parts (e.g., particles) for the purpose of preparing the resin for reuse. The particulate form material thereby obtained is commonly known as "regrind" or "post-industrial recycle" (PIR). The regrind may be introduced into the virgin resin stream. The amount of regrind that may be present in the resin used to manufacture articles such as preforms for blow molding bottles and/or containers may vary over a wide range depending on availability of the resin, the end purpose of the formed article, and other various factors. Regrind may constitute from 0 to 100% of the resin used to form a processed (e.g., injection molded) article such as a preform that may be used to blow mold a container. For example, thermoforming may include regrind in an amount of from about 40 to 100%, EBM may include about 20 to 60% regrind, custom containers may include regrind from about 0 to 20%, and CSD/Beer containers include regrind from about 0 to 30%, where % is % by weight based on the amount of regrind and the total weight of the resin. Amounts of regrind that vary from the above amounts may be present including any range or sub-range of the ranges above including any increment of 1, 2, 3, 5, and 10%.

In a preferred embodiment of the invention, the extruded shaped article formed from the ultra-high IV polyester resin is a molten parison used to make handleware. Typically, the parison contains the polyester resin but in other embodiments the parison may include additives or may be a mixture of the polyester with one or more other resins. Preferably, the parison is fabricated from the polyester resin by melt extrusion. The parison may be of any size including the range of from 50 or less grams to 200 or more grams for each parison.

The extrusion of the polyester resin to form the EBM parison may be carried out under different conditions. Preferably, extrusion is carried out with an EBM apparatus that is capable of completely melting the polyester resin and having sufficient injection pressure to rapidly extrude the molten resin through a shaped die into the desired parison shape. The extruder portion of such a molding apparatus may contain a plurality of heating zones. The temperature of each heating zone is independently controlled. The number of heating zones is not limited, preferably, the number of heating zones is 4 or more, more preferably 5 or more, more preferably 6 or more, more preferably 7 or more, more preferably 8 or more, even more preferably 9 or more, most preferably 10 or more. Each heating zone is capable of heating the polyester resin to a temperature above the melting temperature of the polyester resin. The temperature of any zone may vary from, for example, 400 to 600° F., preferably from 450 to 550° F., more preferably from 475 to 525° F., most preferably about 500° F. Any of the aforementioned temperatures may be varied by any increment of, for example, 2, 4, 6, 8 or 10° F., or any multiple thereof.

The screw speed of an EBM apparatus used to carry out the molding may be varied as needed to adjust cycle time and other factors of the extrusion process. For example, the screw speed may be from 5 to 100 rpm, preferably from 10 to 80 rpm, more preferably from 20 to 60 rpm, more preferably from 30 to 50 rpm, more preferably about 40 rpm. The screw speed may be varied in any increment of 1, 2, 4, 6, 8 and 10 rpm within any of the aforementioned ranges, or any multiple thereof.

The head pressure of the extrusion process may be varied and may range from 0 to 1800 psig, preferably from 300 to 1500 psi, more preferably from 800 to 1200 psi. The cycle time is preferably less than 30 seconds, more preferably less than 20 seconds, and most preferably less than 10 seconds. The cycle time is the total time from clamp open to clamp open. The cycle time is usually defined by the following functions; mold close, blow air injection, hot-knife cut, mold shuttle, part cooling, mold open, part ejection, mold return, mold close. Simultaneously and within the same amount of time, resin is being melted into a liquefied state, the resin is undergoing conditioning (e.g. extrusion), and the molten resin (e.g., polymer melt) is continuously forming another parison in preparation for transfer into the mold space. One method includes feeding the resin into an extruder for melting and mixing within a heated extruder with a revolving screw that compresses and conditions the polymer as it changes phase from a solid to a liquid, the liquefied resin is then continuously extruded into a hollow parison which is subsequently captured into a mold. Since these actions may dependently coincide, a correlation can be drawn between the time of the cycle, and the time that the polymer is in the liquid phase. This correlation may differ from bottle parison to bottle parison and from mold to mold and from machine to machine.

During molding the bottle from the hot, molten parison following capture into the mold, the parison is expanded under pressure by a gas to fill the outer dimensions of the mold. During this blowing process the polyester resin may undergo significant stretching. Typically in EBM there is little or no axial stretch since the extruded parison is longer than the length of the mold in order to insure top and bottom capture into the mold. The hoop stretch ratio of the EBM container may be, for example, from 3 to 7 times, preferably from 3.5 to 6.5 times, more preferably from 4 to 6 times, most preferably from about 4.5 to about 5.5 times, even more preferably about 5 times.

The bottle parison may be blown into a straight wall mold or into shaped and/textured molds and of all sizes may be used without restriction. One handleware bottle form is a two-liter or larger laundry detergent bottle. Another form is a one-gallon juice bottle.

The container formed from the polyester parison is preferably free of haze. The temperature of the extruded parison may be adjusted so that haze is not observed in the EBM article. A parison temperature that is too low during EBM may result in unacceptable material distribution whereas a parison temperature that is too high may result in haze or unacceptable material distribution.

In another aspect of the invention, the polyester resin starting material obtained without solid-state polymerization is made by processing directly from a finisher (e.g., a wiped- or thin-film evaporator), through a die and subsequently pelletizing with water cooling and latent heat crystallization.

In one embodiment, the starting material resin is extruded in the form of strands that may be cut at temperatures higher than the glass transition temperature of the resin. Preferably the strands are cut at temperatures that are 50, 100, 150, or 200° C. or more above the glass transition temperature of the resin concurrently or after the strands have passed through a water bath. The chips are preferably separated from the water as quickly as possible. The temperature at the exterior of the pellets may be lower than the temperature inside the pellets. The chips and/or pellets may continue to crystallize via their inside residual heat (e.g., latent heat crystallization). The polymer (e.g., resin) used in the invention may be latent heat crystallized or alternatively may be conventionally crystallized. Optionally, a chip vibrator or a fluidized bed may be used to prevent the chips from sticking together during heating and/or crystallization.

One way to reduce the tendency of chips to stick together is by imparting more rapid or more robust crystallinity to the chips and/or pellets formed during cooling and/or cutting. This may especially be the case if the resin contains more than one type of polymer. However, for the production of preferred containers that are clear, it is important to minimize the crystallinity of the polyester starting material resin and during SSP processing in order to obtain the ultra-high IV product of the present invention. This is preferably done by including a co-monomer in the polyester starting material resin that helps retard or reduce the rate and degree of crystallization. Suitable comonomers for this purpose include, but are not limited to, isophthalic acid (IPA, or esters thereof), di-ethylene glycol (DEG), cyclohexane di-methanol (CHDM). These co-monomers are used individually in amounts of 1% or higher, preferably 2% or higher, more preferably 3% or higher, most preferably 4% or higher or collectively in amounts of 4% or higher, preferably 5% or higher, and more preferably 6% or higher.

In a preferred embodiment of the invention, the molten polyester composition is partially cooled to solidify the composition. The temperature to which the polyester compositions are partially cooled is between the glass transition temperature (Tg) and the melting point of the polyester resins. The polymer composition is then maintained at a temperature of 170±50° C., preferably ±40° C., and more preferably ±30° C., especially preferably ±20° C., for PET crystallization by separating the hot chips from the water as quickly as possible. Separation of the solidified polyester composition from, for example, a water bath, may be facilitated with a centrifugal drier, a vibrating plate and/or a vibrating screener, such as those available from Rieter, BKG and Gala Industries. The residual heat of the chips can be used for in-situ (latent heat) crystallization without a conventional crystallizer. Preferably, this aspect of the invention is carried out on a polyester resin.

The polyester starting material resin may be made by a melt-phase reaction carried out in a plurality of reactors connected in series, in parallel, or in both series and parallel. The reaction of the dicarboxylic acid and diol monomers may be carried out in the absence of any solvent (e.g., a diluent component that does not form a substantial portion of the reacted polymer units in the resin composition). The monomer units are reacted to form a material having an intrinsic viscosity that may preferably range in one embodiment of the invention from 0.2 to 0.5 IV prior to the final finisher. The molten material thus formed in the melt-phase reactor is then pumped or transferred to a finishing reactor. The finishing reactor may be a reactor such as a wiped- or thin-film reactor which provides substantial contact between surface areas of the reactor and results in high mixing of the molten reacted melt-phase product. The finishing process may be carried out in one or more reactors connected in series, parallel, or both in series and parallel. In addition to the wiped-film reactor, one or more falling film or pipe reactors may be included. The resin product obtained from the last finishing reactor may have an intrinsic viscosity of from 0.65 to 0.9, preferably from 0.7 to 0.85, more preferably from 0.72 to 0.80, and especially preferably about 0.76.

The molten resin product obtained from the finishing reactor is then preferably subjected to a polymer filtration in the molten form. Polymer filtration may be carried out in one or more steps.

For the polyester starting material resin the polymerization of the monomer units is preferably carried out to provide a target intrinsic viscosity of from 0.65 to 0.9, more preferably from 0.7 to 0.85, even more preferably from 0.72 to 0.80, especially preferably about 0.76.

In a further embodiment of the invention the polymeric compositions of the invention contain one or more additives such as fillers. Fillers may include materials such as clays, nanomaterials and/or other polymeric materials, e.g., nylon.

The polyester compositions of the invention preferably contain a PET resin that contains copolymerized IPA monomer units. The invention encompasses at least a low-IPA and a high-IPA PET resin. For example, a low-IPA composition (i) which contains a PET resin having an amount of IPA monomer units of up to 6% by mol. In a preferred embodiment the low-IPA PET resin contains 4-5 mol % of IPA monomer units. The low-IPA PET resin contains from 2-4 mol % of polymerized IPA monomer units based upon the total number of moles dicarboxylic acid monomer units. Hereinafter the PET resin containing a low amount of IPA monomer units is referred to as the low-IPA PET resin.

Another PET resin is a high-IPA PET resin, for example (ii) high-IPA PET resin wherein IPA monomer units are present in an amount of from 6-30 mol %, preferably from 8-25%, and more preferably from 10-20% by mol based on the total number of moles of dicarboxylic acids in the PET polymer. Other ranges include 10-28%, 12-30%, and all ranges and sub-ranges appearing between and any of 14%, 16%, 18%, 20%, 22%, 24%, and 26% and/or the above stated ranges.

Thus, in preferred embodiments, the polyester compositions of the invention may include a PET matrix resin such as the low-IPA resin or the high-IPA resin described above together with one or more additives such as an inorganic filler or a co-barrier resin. Preferably a composition comprising the low-IPA resin contains from 2-8% by weight of a co-barrier resin, where % by weight is based on the total weight of the composition. More preferably, the co-barrier resin is present in the low-IPA PET matrix resin in an amount of from 2-6% by weight, and even more preferably the co-barrier resin is present in an amount of from 4-5% by weight.

In another preferred embodiment, the starting material resin of the invention contains the high-IPA resin as a matrix and a co-barrier resin. The co-barrier resin is preferably present in the matrix of the high-IPA PET resin in an amount of up to 5% by weight, preferably less than 3% by weight, more preferably up to 1% by weight, where percent by weight is based on the total weight of the composition.

EXAMPLES

In a comparison of the SSP behavior of conventional PET resins and the ultra-high IV PET resins of the present invention, the following experiments were performed with the experimental data recorded in TABLE 1.

Experiment 1

Four batches (batch nos. 1, 2, 3 and 6) of 300 lbs. each were solid stated to an IV of 1.0 in a rotary vacuum dryer rotating at 2.5 rpm and under vacuum of 110 Torr. The batch time was started when the pellet temperature had reached 210° C. for batches 2 and 3 and 217° C. for batches 1 and 6. Samples were taken at the start of the batch and periodically through the batch to determine the SSP lift rate and the time that the batch would reach the final IV of 1.0. These samples were measure for intrinsic viscosity using the method described in ASTM D 4603-03. The results of this analysis are shown in FIG. 4. Batch 1 is MT 3% IPA, batch 2 is MT 6% IPA, batch 3 is WMT 6% IPA and batch 6 is 3001.

Experiment 2

Figure 5:
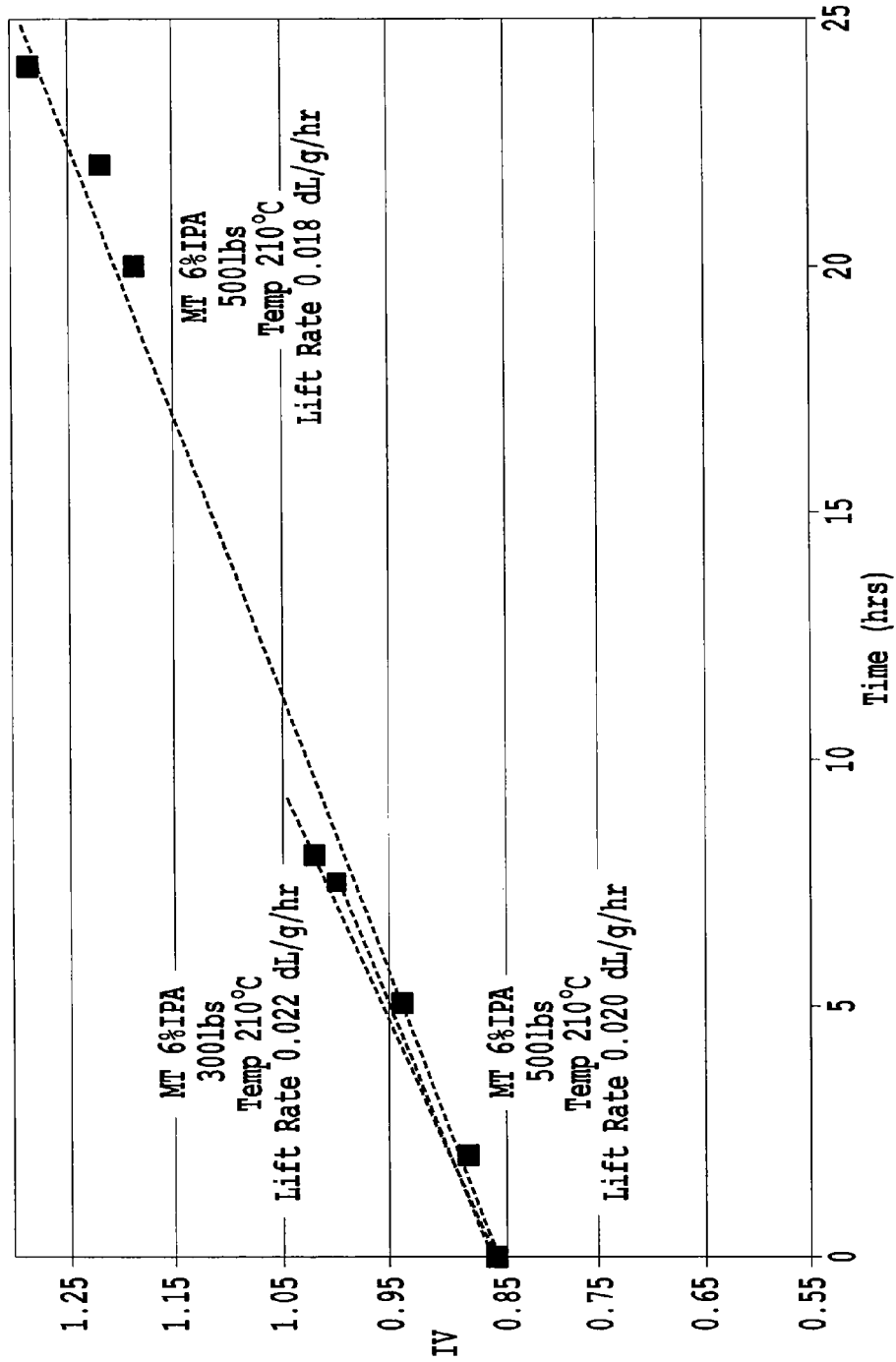
FIG. 5 provides a graphical representation of IV change during SSP over longer SSP times of a starting material resin of the present invention to provide the ultra-high IV resin of the present invention.

Three batches of MT 6% IPA (batch nos. 2, 4 and 5) were solid stated in a rotary vacuum dryer rotating at 2.5 rpm and under a vacuum of 110 Torr. The batch time was started when the pellet temperature had reached the set point of 210° C. Batch 2 was 300 lbs. and was lifted to 1.0 IV. Batch 4 was 500 lbs. and was lifted to 1.0 IV. Batch 5 was 500 lbs. and was lifted to 1.3 IV. Samples were taken at the start of the batch and periodically through the batch to determine the SSP lift rate and the time that the batch would reach the target IV. These samples were measure for intrinsic viscosity using the method described in ASTM D 4603-03. The results of this analysis are shown in FIG. 5

Experiment 3

Figure 6:
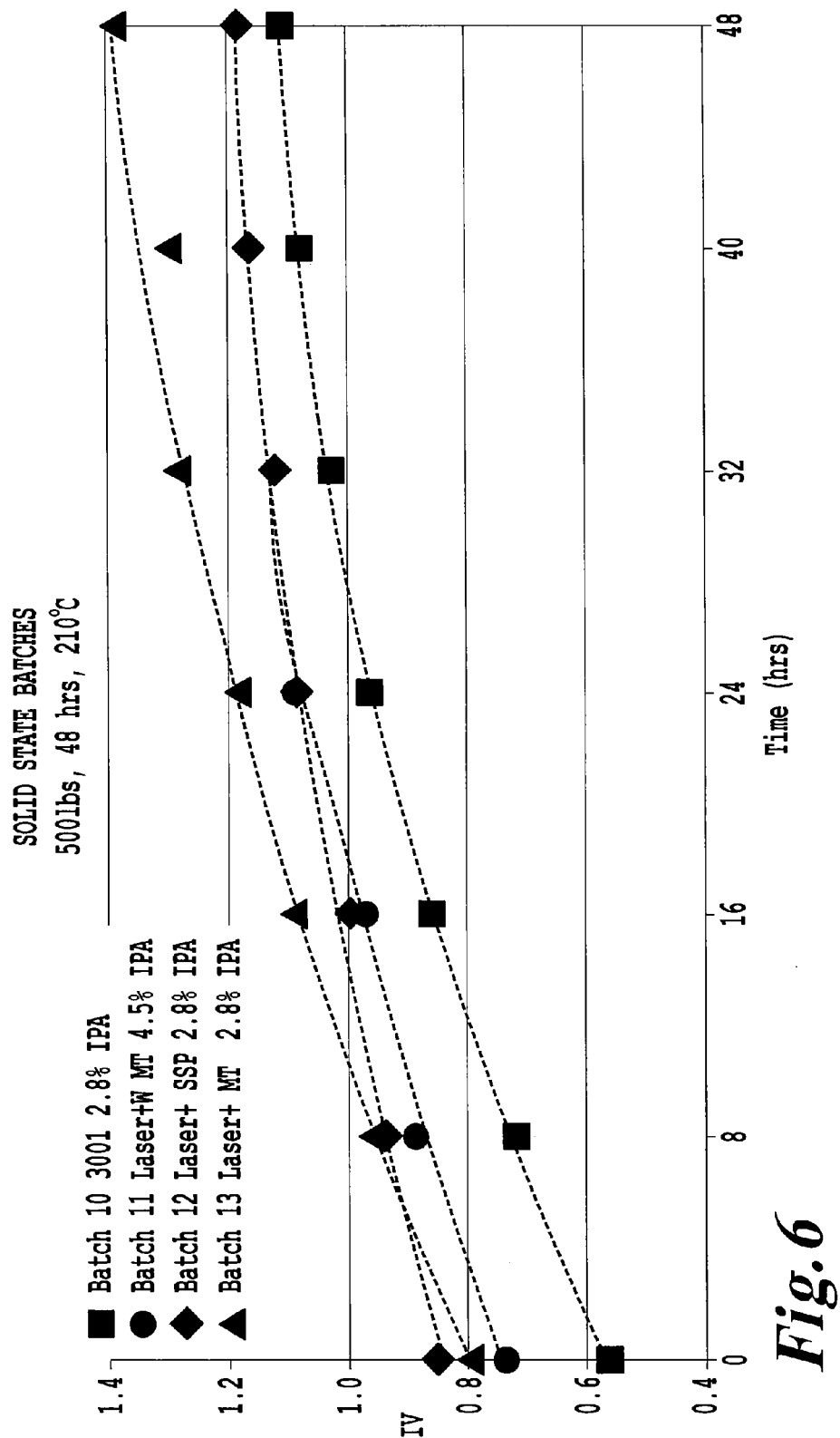
FIG. 6 provides further graphical representation comparing the SSP lifting of a conventional PET resin of low starting IV of <0.65 (square symbols), conventional PET resin that has been solid-state polymerized to IV of >0.8 (diamond symbols), with melt-produced starting material used to prepare the ultra-high IV PET resin of the present invention (circle and triangle symbols).
Figure 7:
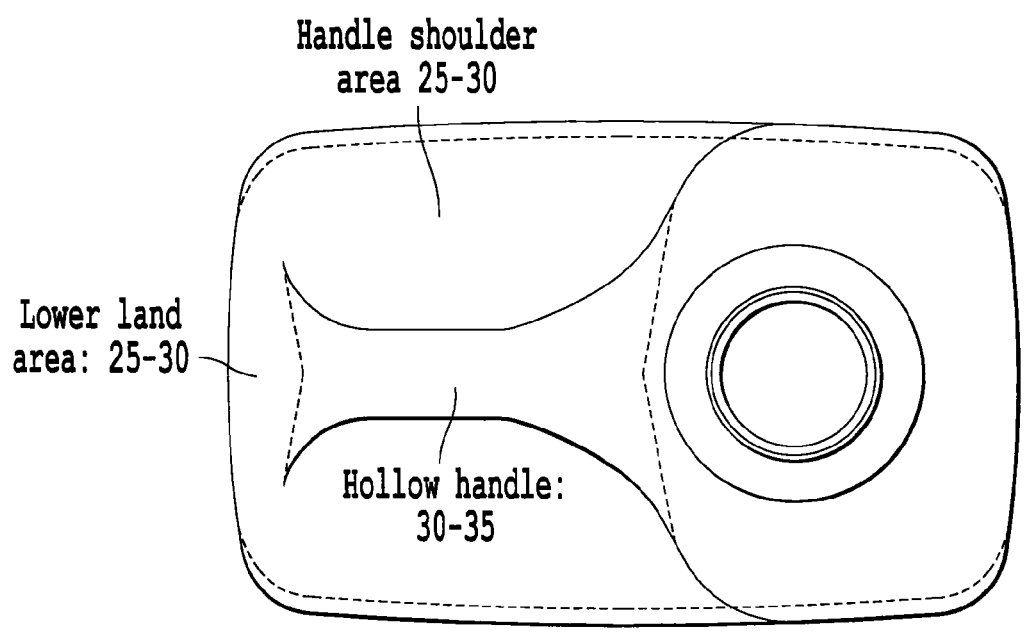
FIG. 7 provides Top View of typical wall material thickness distribution in a 128 oz. bottle manufactured by an extrusion blow molding process. Bottle weight 150±4 grams. All dimensions in mils.
Figure 8:
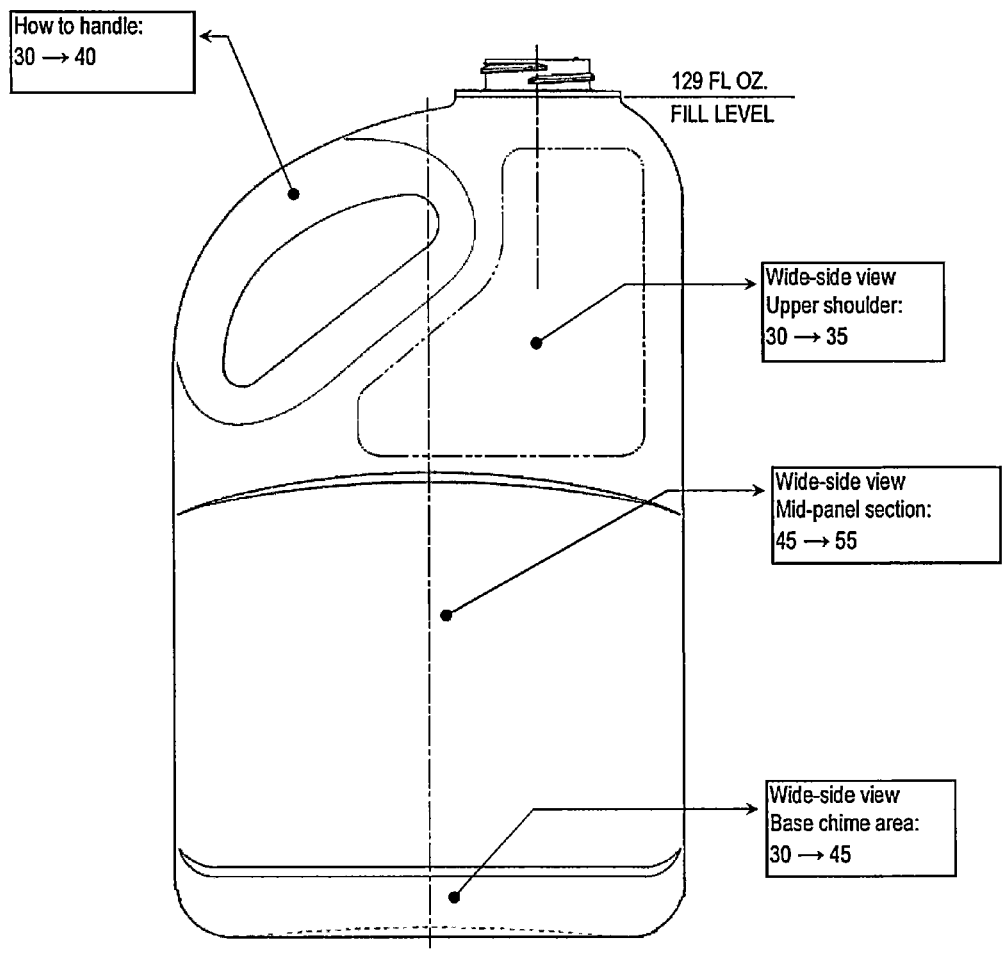
FIG. 8 provides Wide Side View of typical wall material thickness distribution in a 128 oz. bottle manufactured by an extrusion blow molding process. Bottle weight 150±4 grams. All dimensions in mils.
Figure 9:
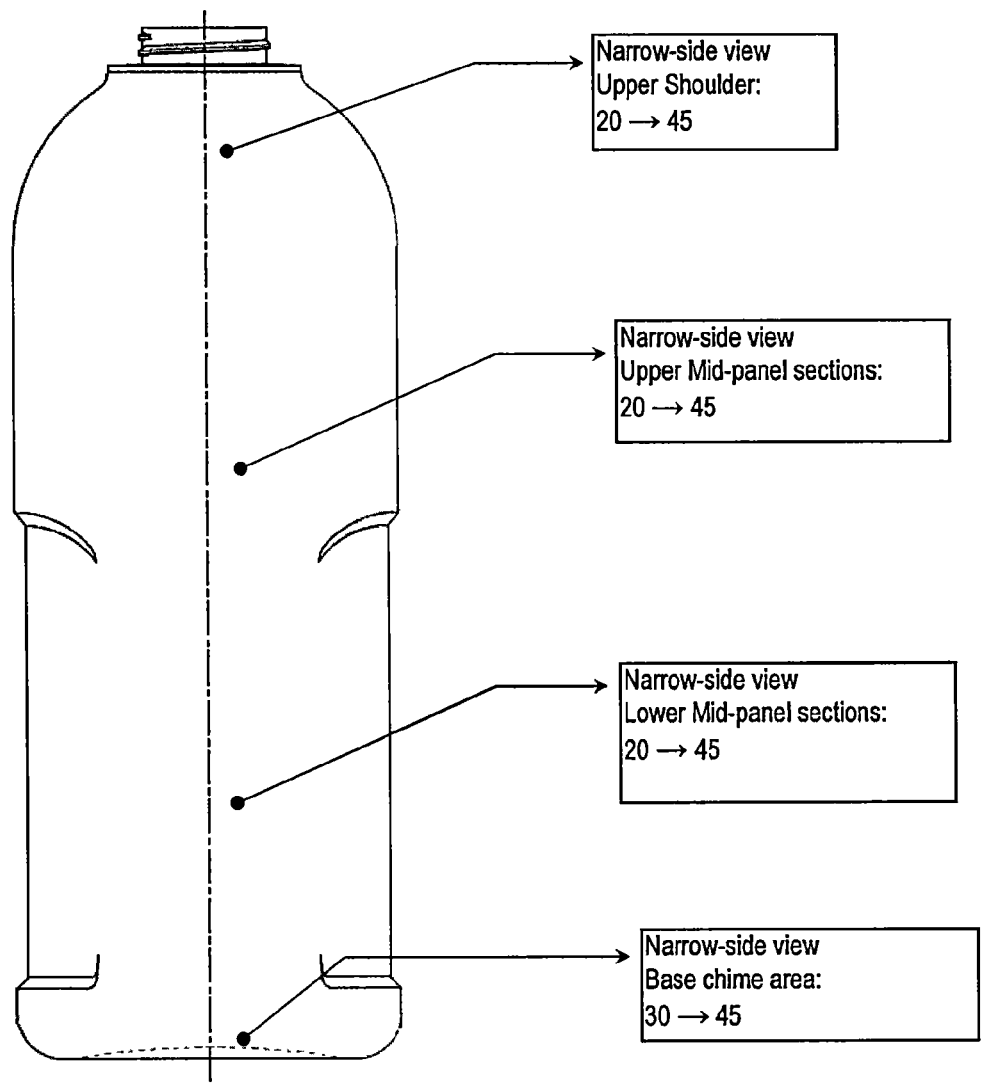
FIG. 9 provides Narrow Side View of typical wall material thickness distribution in a 128 oz. bottle manufactured by an extrusion blow molding process. Bottle weight 150±4 grams. All dimensions in mils.
Figure 10:
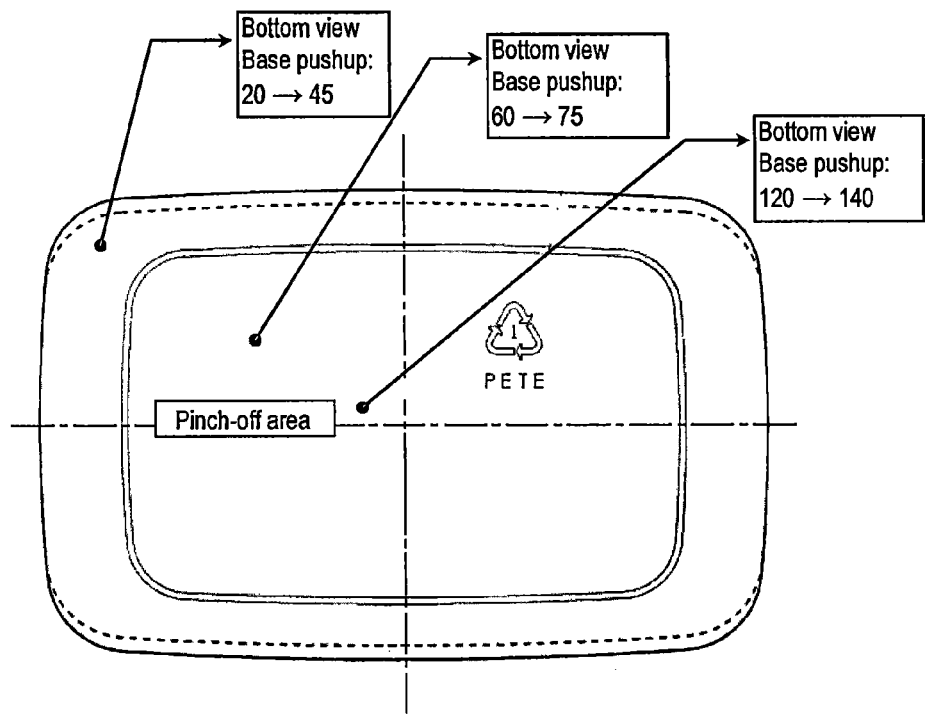
FIG. 10 provides Bottom View of typical wall material thickness distribution in a 128 oz. bottle manufactured by an extrusion blow molding process. Bottle weight 150±4 grams. All dimensions in mils.

Four batches (batch nos. 10, 11, 12 and 13) of 500 lbs. each were solid stated in a rotary vacuum dryer rotating at 2.5 rpm and under vacuum of 100 Torr for 48 hours. The batch time was started when the pellet temperature had reach the set point of 210° C. Samples were taken at the start of the batch and every eight hours until batch completion at 48 hours. These samples were measure for intrinsic viscosity using the method described in ASTM D 4603-03. The results of this analysis are shown in FIG. 6.

TABLE 1

| Batch No. | Batch Resin | Batch Size (lbs) | Starting IV | End IV | Reactor Temp (° C.) | Batch Time (hrs) | Avg Lift Rate dL/(g/hr) | Final Batch Results |||||||||
|---|---|---|---|---|---|---|---|---|---|---|---|---|---|---|---|---|
| | | | | | | | | DSC |||| COOH | IPA | DEG | L* | a* | b* |
| | | | | | | | | Tm 1 | Tm 2 | Tg | % crys | | | | | | |
| 1 | MT 3% IPA | 300 | 0.80 | 1.04 | 217 | 8.5 | 0.028 | 236.2 | 234.7 | 81.2 | 49.1 | 20 | 2.8 | 1.5 | 80.5 | −2.1 | −0.9 |
| 2 | MT 6% IPA | 300 | 0.85 | 1.02 | 210 | 8 | 0.022 | 229.9 | 228.3 | 80.0 | 44.9 | 14 | 5.6 | 1.6 | 80.1 | −2.4 | −1.1 |
| 3 | WMT 6% IPA | 300 | 0.76 | 0.99 | 210 | 11 | 0.021 | 230.3 | 227.3 | 79.8 | 47.6 | 10 | 6.3 | 1.5 | 81.3 | −2.1 | −1.7 |
| 4 | MT 6% IPA | 500 | 0.85 | 1.28 | 210 | 24 | 0.018 | 234.7 | 225.1 | 79.6 | 47.6 | 6 | 5.6 | 1.6 | 81.1 | −2.7 | 0.4 |
| 5 | MT 6% IPA | 500 | 0.85 | 1.00 | 210 | 7.5 | 0.020 | 229.0 | 228.5 | 79.9 | 46.0 | 7 | 5.6 | 1.6 | 80.1 | −2.6 | −1.0 |
| 6 | 3001 | 300 | 0.56 | 1.02 | 217 | 24 | 0.019 | 241.1 | 237.4 | 81.3 | 54.9 | 15 | 2.8 | 1.5 | 79.2 | −2.8 | −2.2 |
| 7 | 3001 | 300 | 0.56 | 0.85 | 217 | 12 | 0.025 | 236.9 | 240.6 | 81.1 | 53.2 | 18 | 2.7 | 1.5 | 78.5 | −2.4 | −3.6 |
| 8 | P45A | 500 | 0.72 | 1.30 | 210 | 40 | 0.014 | 238.7 | 228.0 | 79.8 | 54.1 | 8 | 4.6 | 1.5 | 82.5 | −2.4 | 1.6 |
| 9 | MT 3% IPA | 500 | 0.80 | 1.31 | 210 | 35 | 0.014 | 238.2 | 234.0 | 80.7 | 53.6 | 15 | 2.7 | 1.5 | 81.8 | −2.5 | 1.3 |
| 10 | 3001 48 hrs | 500 | 0.56 | 1.10 | 210 | 48 | 0.011 | 242.7 | 235.2 | 81.8 | 59.4 | 10 | 2.7 | 1.5 | 79.0 | −3.2 | −1.2 |
| 11 | P45A 48 hrs | 500 | 0.73 | 1.36 | 210 | 48 | 0.013 | 241.4 | 227.6 | 81.1 | 55.5 | 7 | 4.8 | 1.6 | 83.3 | −2.6 | 2.7 |
| 12 | SSP 3% (B95A) 48 hrs | 500 | 0.85 | 1.17 | 210 | 48 | 0.007 | 247.6 | 234.5 | 81.5 | 62.0 | 4 | 2.7 | 1.6 | 82.2 | −3.5 | 1.4 |
| 13 | MT 3% IPA 48 hrs | 500 | 0.79 | 1.39 | 210 | 48 | 0.012 | 240.9 | 231.0 | 82.4 | 55.7 | 12 | 2.8 | 1.5 | 81.6 | −3.2 | 3.4 |

The invention claimed is:

1. A method for producing an ultra-high intrinsic viscosity (IV) polyester resin having a final IV ($IV_f$) of at least 0.9 dL/g, comprising:
preparing a polyester starting material having a starting IV ($IV_{st}$) by melt polymerizing a precursor and/or monomer mixture with no more than 0.05 dL/g of IV lift due to solid-state polymerization, wherein the ($IV_{st}$) meets the following relationship:

$$0.65 \text{ dL/g} < IV_{st} < 0.9 \text{ dL/g};$$

extruding the polyester starting material,
concurrently forming resin particles by underwater pelletizing and latent heat crystallizing the resin particles to form crystallized particles having a variation of IV of no more than 0.05 dL/g across any dimension of the crystallized particles, and
solid-state polymerizing the crystallized particles to form the ultra-high intrinsic viscosity (IV) polyester resin having a final IV ($IV_f$) of at least 0.9 dL/g,
wherein the polyester starting material is a polyethylene terephthalate polymer containing one or more comonomers in amounts up to 30 mol %.

2. The method of claim 1, wherein the $IV_f$ of the ultra-high IV polyester is greater than 1.0 dL/g.

3. The method of claim 2, wherein the $IV_f$ of the ultra-high IV polyester is greater than 1.1 dL/g.

4. The method of claim 3, wherein the $IV_f$ of the ultra-high IV polyester is greater than 1.2 dL/g.

5. The method of claim 4, wherein the $IV_f$ of the ultra-high IV polyester is greater than 1.3 dL/g.

6. The method of claim 1, wherein the $IV_{st}$ of the polyester starting material is from 0.70 to 0.85 dL/g.

7. The method of claim 6, wherein the $IV_{st}$ of the polyester starting material is from 0.72 to 0.82 dL/g.

8. The method of claim 1, wherein the crystallized particles have a variation of IV of no more than 0.03 dL/g across any dimension of the resin particle.

9. The method of claim 1, wherein the solid-state polymerizing is carried out at a temperature of 190-230° C.

10. The method of claim 9, wherein the solid-state polymerizing is carried out at a temperature of 200-225° C.

11. The method of claim 10, wherein the solid-state polymerizing is carried out at a temperature of 210-220° C.

12. The method of claim 11, wherein the solid-state polymerizing is carried out at a temperature of about 215° C.

13. The method of claim 1, wherein the one or more comonomers are selected from the group consisting of diethylene glycol (DEG), cyclohexane dimethanol (CHDM), 1,3-propane diol, isophthalic acid (IPA).

14. The method of claim 13, wherein the one or more comonomers are both DEG and IPA.

15. The method of claim 14, wherein the IPA is present in an amount of from 2-6 mol %.

16. The method of claim 14, wherein the IPA is present in an amount of from 8-25 mol %.

17. The method of claim 14, wherein the DEG is present in an amount of 2 mol % or less.

18. The method of claim 1, wherein the crystallized particles subjected to the solid-state polymerizing have a starting IV ($IV_{st}$) of from 0.76 to less than 0.9 dL/g.

19. The method of claim 1, wherein the ultra-high IV polyester resin formed by the solid-state polymerizing has an IV lift rate of from 0.021 to 0.028 dL/g/hr.

20. The method of claim 1, wherein the polyester starting material contains up to 6 mol % isophthalic acid monomer units.

21. The method of claim 1, wherein the crystallized particles subjected to the solid-state polymerizing have a starting IV ($IV_{st}$) of from 0.75 to 0.85 dL/g.

22. The method of claim 1, wherein the polyester starting material is a copolymer comprising from 3 to 6% isophthalic acid monomer units and has a starting IV ($IV_{st}$) of 0.75 to 0.85 dL/g, and wherein the ultra-high IV polyester resin formed by the solid-state polymerizing has an IV lift rate of from 0.021 to 0.028 dL/g/hr.

23. The method of claim 1, wherein the ultra-high IV polyester resin formed by the solid-state polymerizing has an IV of at least 1.0 dL/g.

24. The method of claim 1, wherein the ultra-high IV polyester resin formed by the solid-state polymerizing has an IV of at least 1.1 dL/g.

\* \* \* \* \*